(12) United States Patent
Shimada

(10) Patent No.: US 11,106,351 B2
(45) Date of Patent: Aug. 31, 2021

(54) EVALUATING APPARATUS AND TERMINAL DEVICE

(71) Applicant: FUJIFILM BUSINESS INNOVATION CORP., Tokyo (JP)

(72) Inventor: Yuhei Shimada, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 900 days.

(21) Appl. No.: 15/814,142

(22) Filed: Nov. 15, 2017

(65) Prior Publication Data

US 2018/0164975 A1 Jun. 14, 2018

(30) Foreign Application Priority Data

Dec. 8, 2016 (JP) .............................. JP2016-238701

(51) Int. Cl.
| | |
|---|---|
| *G06F 3/0488* | (2013.01) |
| *G06Q 30/02* | (2012.01) |
| *G06F 16/25* | (2019.01) |
| *G06F 1/16* | (2006.01) |

(52) U.S. Cl.
CPC ............ *G06F 3/0488* (2013.01); *G06F 1/163* (2013.01); *G06F 16/25* (2019.01); *G06Q 30/02* (2013.01); *G06Q 30/0203* (2013.01)

(58) Field of Classification Search
CPC ........ G06F 3/0488; G06F 16/25; G06F 1/163; G06Q 30/02; G06Q 30/0203
USPC ............................ 345/173; 702/181; 715/702
See application file for complete search history.

(56) References Cited

U.S. PATENT DOCUMENTS

| | | | | |
|---|---|---|---|---|
| 5,754,843 A | * | 5/1998 | Imanaka | ............ H04N 7/17318 |
| 2010/0010776 A1 | * | 1/2010 | Saha | ........................ G06Q 10/06 702/181 |
| 2014/0108504 A1 | * | 4/2014 | Hirosawa | ................ H04L 67/42 709/203 |
| 2014/0358777 A1 | * | 12/2014 | Gueh | ................. G06Q 20/1085 705/43 |
| 2015/0277564 A1 | * | 10/2015 | Saito | ..................... G06F 3/0485 715/702 |
| 2016/0117699 A1 | | 4/2016 | Tanabe | |

(Continued)

FOREIGN PATENT DOCUMENTS

| | | |
|---|---|---|
| JP | 2009-211574 A | 9/2009 |
| JP | 2010-15325 A | 1/2010 |
| JP | 2011-129034 A | 6/2011 |

(Continued)

OTHER PUBLICATIONS

Oct. 15, 2020 Office Action issued in Japanese Patent Application No. 2016-238701.

(Continued)

*Primary Examiner* — Prabodh M Dharia

(74) *Attorney, Agent, or Firm* — Oliff PLC

(57) ABSTRACT

An evaluating apparatus includes a notifying unit and an evaluating unit. The notifying unit notifies a terminal device of a reply request. The evaluating unit calculates subjective data which expresses a subjective intuition of a target person by an evaluation value, from objective data which is calculated based on plural touch operations performed by the target person on the terminal device which is notified of the reply request in consideration of intervals between the touch operations.

15 Claims, 18 Drawing Sheets

(56) References Cited

U.S. PATENT DOCUMENTS

2019/0183713 A1* 6/2019 Sankai ................ A61H 1/0262

FOREIGN PATENT DOCUMENTS

| JP | 2011-238180 A | 11/2011 |
| JP | 5877455 B2 | 3/2016 |
| JP | 2010-237729 A | 10/2020 |
| WO | 2014/185423 A1 | 11/2014 |

OTHER PUBLICATIONS

Minako Toba et al., "Correlation Analysis between Office Workers' Stress and Features Extracted from PC-Operation Logs"; Journal of the Institute of Electronics, Information and Communication Engineers; 2012; vol. J95-D; No. 4.

Jun. 15, 2021 Office Action issued in Japanese Patent Application No. 2016-238701.

* cited by examiner

FIG.4

| DISTRIBUTION ID | REPLY ID | TAPPING START TIME | TAPPING END TIME | NUMBER OF TIMES OF TAPPING | AVERAGE TAPPING INTERVAL [ms] |
|---|---|---|---|---|---|
| d0001 | r0001 | ..... | ..... | 9 | 293.3 |
| d0001 | r0002 | ..... | ..... | 4 | 589.1 |
| ... | ... | ... | ... | ... | ... |
| d0001 | r0010 | ..... | ..... | 2 | 899.9 |

| DISTRIBU-TION ID | USER ID | DISTRIBUTION START TIME | FINAL DISTRIBUTION TIME | DISTRIBUTION END TIME | DISTRIBU-TION INTERVAL | QUESTION ID | DISTRIBUTED FLAG | DISTRIBUTION END FLAG |
|---|---|---|---|---|---|---|---|---|
| d0001 | X023 | 2016/09/05 10:00:00 | 2016/09/05 10:03:04 | 2016/09/05 17:00:00 | 5:00 | a001 | DISTRIBUTED | NOT ENDED |
| d0002 | X046 | 2016/09/05 10:30:00 | | 2016/09/05 17:00:00 | 5:00 | a001 | NOT DISTRIBUTED | NOT ENDED |
| d0003 | X201 | 2016/09/06 09:150:00 | | 2016/09/06 17:55:00 | 10:00 | a002 | NOT DISTRIBUTED | NOT ENDED |

| DISTRIBU-TION ID | USER ID | DISTRIBUTION START TIME | FINAL DISTRIBUTION TIME | DISTRIBUTION END TIME | DISTRIBU-TION INTERVAL | QUESTION ID | DISTRIBUTED FLAG | DISTRIBUTION END FLAG |
|---|---|---|---|---|---|---|---|---|
| d0001 | A | 2016/09/05 10:00:00 | 2016/09/05 10:03:04 | 2016/09/05 17:00:00 | 5:00 | a001 | DISTRIBUTED | ENDED |

| QUESTION ID | QUESTION TITLE | NUMBER OF CHOICES |
|---|---|---|
| a001 | DEGREE OF CONCENTRATION | 5 |

412

| REPLY ID | REPLY TIME | USER ID | NUMBER OF TIMES OF TAPPING | AVERAGE TAPPING INTERVAL [ms] | DISTRIBU-TION ID |
|---|---|---|---|---|---|
| r001 | 2016/09/05 10:00:48 | A | 9 | 293.3 | d001 |
| r002 | 2016/09/05 10:06:01 | A | 4 | 589.1 | d001 |
| ⋮ | ⋮ | ⋮ | ⋮ | ⋮ | ⋮ |
| r010 | 2016/09/05 10:59:41 | A | 2 | 899.9 | d001 |

413

| REPLY ID | REPLY TIME | USER ID | AVERAGE TAPPING INTERVAL [ms] | DISTRIBU- TION ID |
|---|---|---|---|---|
| r001 | 2016/09/05 10:00:48 | A | 293.3 | d001 |
| r002 | 2016/09/05 10:06:01 | A | 589.1 | d001 |
| ⋮ | ⋮ | ⋮ | ⋮ | ⋮ |
| r010 | 2016/09/05 10:59:41 | A | 899.9 | d001 |

| REPLY ID | REPLY TIME | USER ID | NUMBER OF TIMES OF TAPPING | AVERAGE TAPPING INTERVAL [ms] | STANDARD DEVIATION OF TAPPING INTERVALS | DISTRIBUTION ID |
|---|---|---|---|---|---|---|
| r001 | 2016/09/05 10:00:48 | A | 9 | 293.3 | 41.3 | d001 |
| r002 | 2016/09/05 10:06:01 | A | 4 | 589.1 | 20.1 | d001 |
| ... | ... | ... | ... | ... | ... | ... |
| r010 | 2016/09/05 10:59:41 | A | 2 | 899.9 | 102.4 | d001 |

| REPLY ID | REPLY TIME | USER ID | NUMBER OF TIMES OF TAPPING | AVERAGE TAPPING INTERVAL [ms] | STANDARD DEVIATION OF TAPPING INTERVALS | ACTIVITY STATE | DISTRIBUTION ID |
|---|---|---|---|---|---|---|---|
| r001 | 2016/09/05 10:00:48 | A | 9 | 293.3 | 41.3 | STOP | d001 |
| r002 | 2016/09/05 10:06:01 | A | 4 | 589.1 | 20.1 | MOVING | d001 |
| ... | ... | ... | ... | ... | ... | ... | ... |
| r010 | 2016/09/05 10:59:41 | A | 2 | 899.9 | 102.4 | STOP | d001 |

EVALUATING APPARATUS AND TERMINAL DEVICE

CROSS-REFERENCE TO RELATED APPLICATIONS

This application is based on and claims priority under 35 USC 119 from Japanese Patent Application No. 2016-238701 filed Dec. 8, 2016.

BACKGROUND

Technical Field

The present invention relates to an evaluating apparatus and a terminal device.

SUMMARY

According to an aspect of the invention, an evaluating apparatus includes a notifying unit and an evaluating unit. The notifying unit notifies a terminal device of a reply request. The evaluating unit calculates subjective data which expresses a subjective intuition of a target person by an evaluation value, from objective data which is calculated based on plural touch operations performed by the target person on the terminal device which is notified of the reply request in consideration of intervals between the touch operations.

BRIEF DESCRIPTION OF THE DRAWINGS

Exemplary embodiments of the present invention will be described in detail based on the following figures, wherein:

FIG. 4 is a diagram illustrating an example of a reply data table;

FIG. 6 is a diagram illustrating an example of a distribution DB;

FIG. 12 is a diagram illustrating an example of contents of the distribution DB in a case where a distribution and a reply have been completed with regard to a user ID A;

FIG. 13 is a diagram illustrating an example of contents of the question DB in a case where a distribution and a reply have been completed with regard to the user ID A;

FIG. 18 is a diagram illustrating modified example 2 of the reply DB;

FIG. 19 is a diagram illustrating modified example 3 of the reply DB;

DETAILED DESCRIPTION

Figure 1:
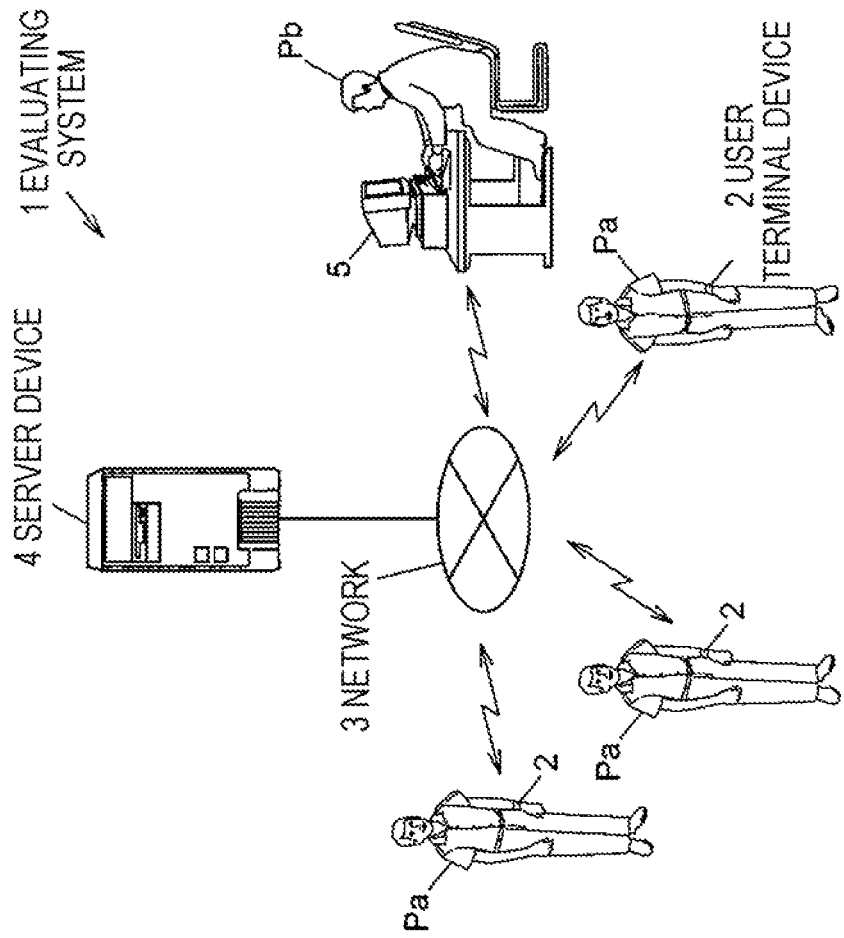
FIG. 1 is a diagram illustrating a schematic configuration example of an evaluating system according to a first exemplary embodiment of the present invention.

Hereinafter, exemplary embodiments of the present invention will be described with reference to the drawings. In each drawing, the constituent elements performing substantially the same functions are denoted by the same reference numerals, and a redundant description thereof will be omitted.

First Exemplary Embodiment

FIG. 1 is a diagram illustrating a schematic configuration example of an evaluating system according to a first exemplary embodiment of the present invention. The evaluating system 1 includes plural user terminal devices 2 which are worn on plural target users Pa, respectively, a server device 4 which makes reply requests, through a network 3, to target users Pa on which the user terminal devices 2 are worn to reply and aggregates the replies, and a research terminal device 5 which is connected to the server device 4 through the network 3 and operated by a researcher Pb. The target users Pa are an example of target persons.

Each user terminal device 2 transmits the number of times of tapping operations and an interval between the tapping operations of the target user Pa to the server device 4 as reply data when receiving a reply request from the server device 4. The reply data will be described in detail below.

The server device 4 makes the reply requests to the user terminal devices 2, and calculates subjective data based on the reply data transmitted from the user terminal devices 2. The server device 4 is an example of an evaluating apparatus. The "subjective data" refers to data related to feelings of the target person, such as a degree of uplift, a degree of concentration, and interesting. The reply data is an example of objective data. The "objective data" refers to sensor data or data related to a physical value which is calculated based on the sensor data.

The research terminal device 5 may be implemented by, for example, a personal computer, and includes an input unit implemented by a keyboard, a mouse, or the like, a display unit implemented by a display, such as a liquid crystal display, a controller implemented by a central processing unit (CPU), an interface, or the like, a memory implemented by a read only memory (ROM), a random access memory (RAM), a hard disk, or the like, and a communication unit connected to the network. The research terminal device 5 visualizes an evaluation result calculated by the server device 4.

(Configuration of User Terminal Device)

Figure 2:
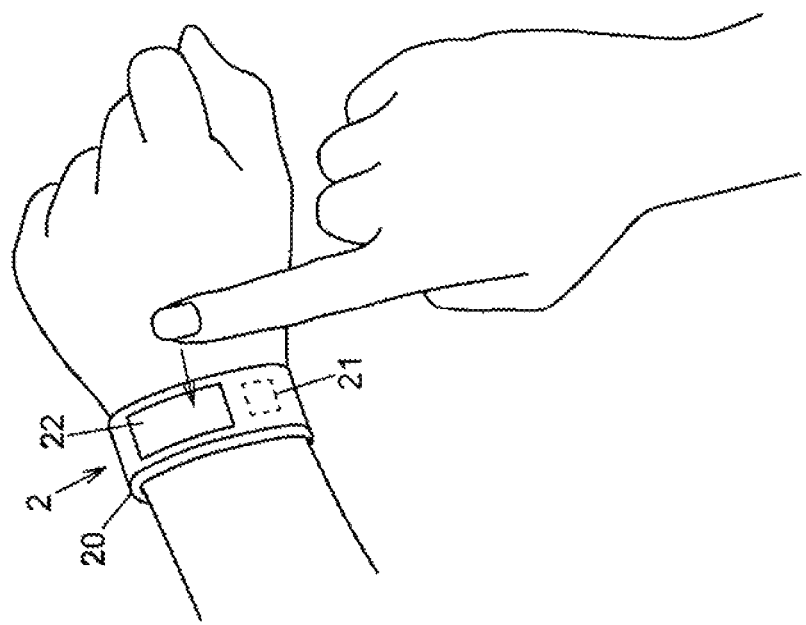
FIG. 2 is a perspective view illustrating an example of a terminal device.
Figure 3:
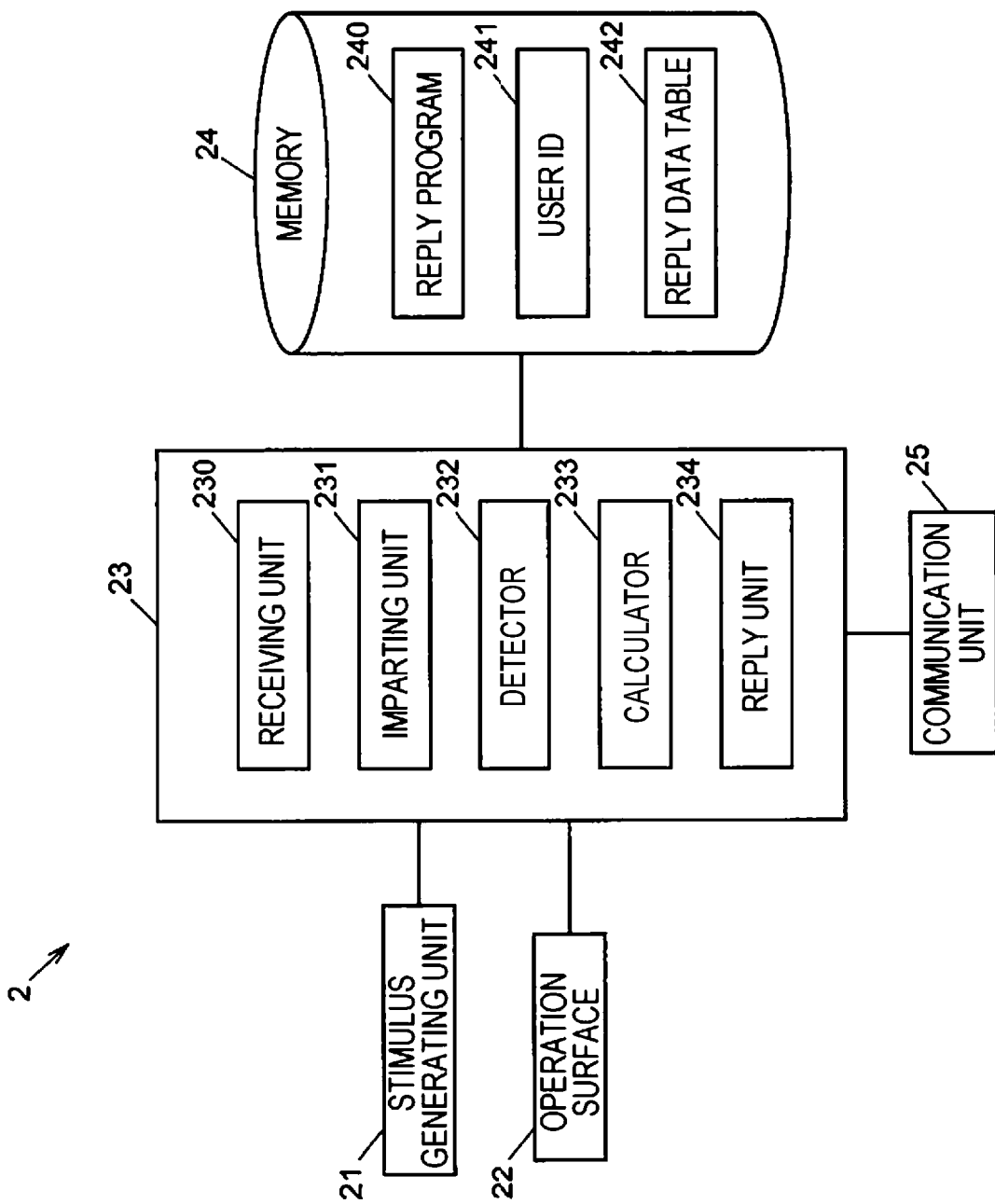
FIG. 3 is a block diagram illustrating an example of a control system of the terminal device.

FIG. 2 is a perspective view illustrating an example of the user terminal device 2 worn on the target user Pa. FIG. 3 is a block diagram illustrating an example of a control system of the user terminal device 2.

The user terminal device 2 is, for example, a wearable terminal device worn on an arm of the target user Pa as illustrated in FIG. 2. The user terminal device 2 includes a belt 20 worn on the arm of the target user Pa, a stimulus generating unit 21 that generates a stimulus to be imparted to the arm, and an operation surface 22 provided on a surface of the belt 20 that is a surface on which the user performs a tapping operation. Tapping or the tapping operation is an example of an operation or a touch operation.

The stimulus generating unit 21 generates, for example, vibrations as the stimulus imparted to the target user Pa. The stimulus imparted to the target user Pa may be sound or light, in addition to vibrations, and may be a combination of two or three of vibrations, sound, and light.

The operation surface 22 may use, for example, a touch sensor and a touch display.

As illustrated in FIG. 3, the user terminal device 2 includes the stimulus generating unit 21 and the operation surface 22 illustrated in FIG. 2, the controller 23 that controls each unit of the user terminal device 2, the memory 24 that stores various information, and the communication unit 25 connected to the network 3.

The controller 23 is configured with a CPU, an interface, and the like. The controller 23 operates according to a reply program 240 to serve as a receiving unit 230, an imparting unit 231, a detector 232, a calculator 233, a reply unit 234, and the like. Each of the units 230 to 234 will be described in detail below.

The memory 24 is configured with a ROM, a RAM, or the like, and stores various data, such as the reply program 240, a user ID 241, and a reply data table 242 illustrated in FIG. 4.

The imparting unit 231 imparts a stimulus to the target user Pa by the stimulus generating unit 21 whenever a reply request is made.

The detector 232 detects plural tapping operations performed by the target user Pa after the stimulus is imparted to the target user Pa by the imparting unit 231.

The calculator 233 calculates reply data to the reply request from the plural tapping operations detected by the detector 232. That is, the calculator 233 calculates the number of times of the tap and an average tapping interval as the reply data. The average tapping interval is an example of an average operation interval.

The reply unit 234 transmits the number of times of tapping and the average tapping interval calculated by the calculator 233 to the server device 4 as the reply data. The reply data includes a reply ID, a reply time, a user ID, the number of times of tapping, the average tapping interval, and a distribution ID.

FIG. 4 is a diagram illustrating an example of the reply data table 242 stored in the memory 24 of the user terminal device 2. The reply data table 242 includes a distribution ID column in which a distribution ID is recorded, a reply ID column in which a reply ID is recorded, a tapping start time column in which a start time of the tapping operation is recorded, a tapping end time column in which an end time of the tapping operation is recorded, a number of times of tapping column in which the number of times of tapping is recorded, and an average tapping interval column in which an average tapping interval is recorded.

(Configuration of Server Device)

Figure 5:
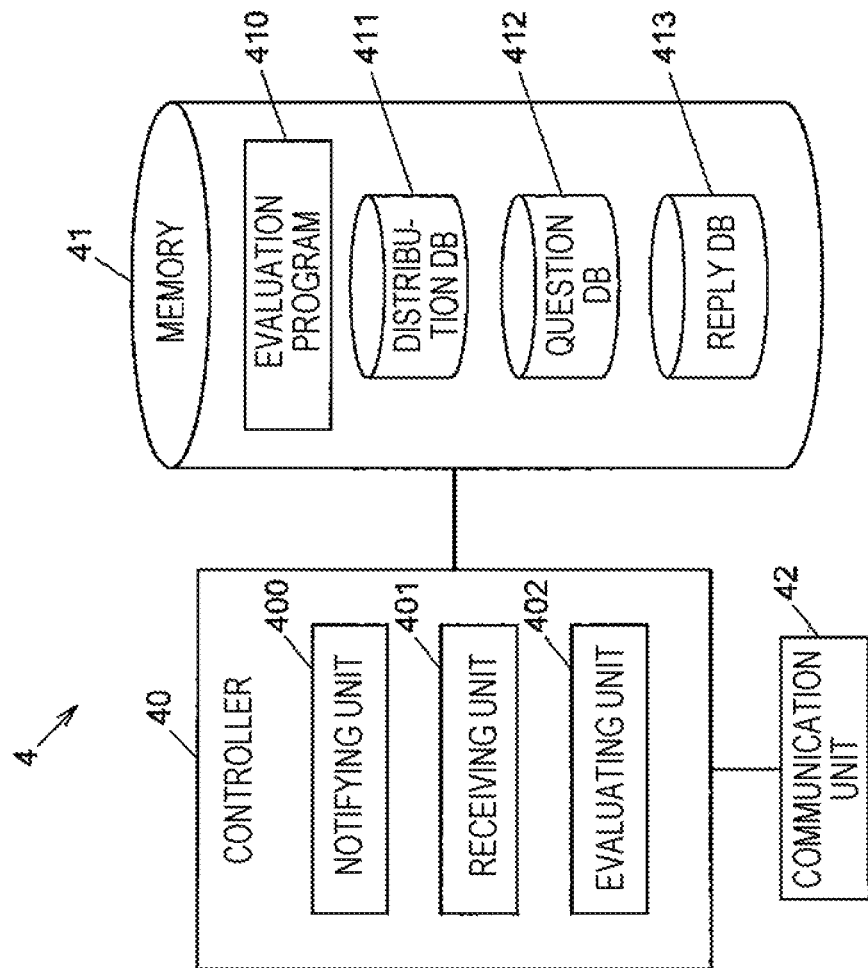
FIG. 5 is a block diagram illustrating an example of a control system of a server device.

FIG. 5 is a block diagram illustrating an example of the control system of the server device 4. The server device 4 includes a controller 40 that controls each unit of the server device 4, a memory 41 that stores various information, and a communication unit 42 that is connected to the network 3.

The controller 40 is configured with a CPU, an interface, or the like. The controller 40 operates according to an evaluation program 410 to serve as a notifying unit 400, a receiving unit 401, an evaluating unit 402, and the like. Each of the units 400 to 402 will be described below in detail.

The memory 41 is configured with a ROM, a RAM, a hard disk, or the like. The memory 41 stores the evaluation program 410 and various data such as a distribution database (DB) 411, a question database (DB) 412, and a reply database (DB) 413.

The notifying unit 400 periodically transmits a signal (hereinafter, referred to as a "reply request signal") representing a reply request to the target user Pa, and notifies the target user Pa of the reply request.

The receiving unit 401 receives the reply data transmitted from the user terminal device 2.

The evaluating unit 402 calculates subjective data of the target user Pa from plural pieces of reply data received by the receiving unit 401. In the present exemplary embodiment, the evaluating unit 402 calculates subjective data by using a formula. Alternatively, the evaluating unit 402 may calculate the subjective data by a method which does not use a formula, for example, by using a table.

FIG. 6 is a diagram illustrating an example of the distribution DB 411. The distribution DB 411 includes a distribution ID column in which a distribution ID is recorded, a user ID column in which a user ID is recorded, a distribution start time column in which a distribution start time is recorded, a final distribution time column in which a final distribution time is recorded, a distribution end time column in which a distribution end time is recorded, a distribution interval column in which a distribution interval is recorded, a question ID column in which a question ID is recorded, a distributed flag column in which a distributed flag is recorded, and a distribution end flag column in which a distribution end flag is recorded.

Figure 7:
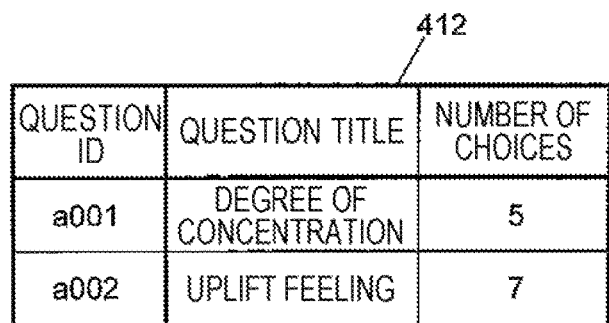
FIG. 7 is a diagram illustrating an example of a question DB.

FIG. 7 is a diagram illustrating an example of the question DB 412. The question DB 412 includes a question ID column in which a question ID is recorded, a question title column in which a question title is recorded, and a number of choices column in which the number of choices is recorded.

Figure 8:
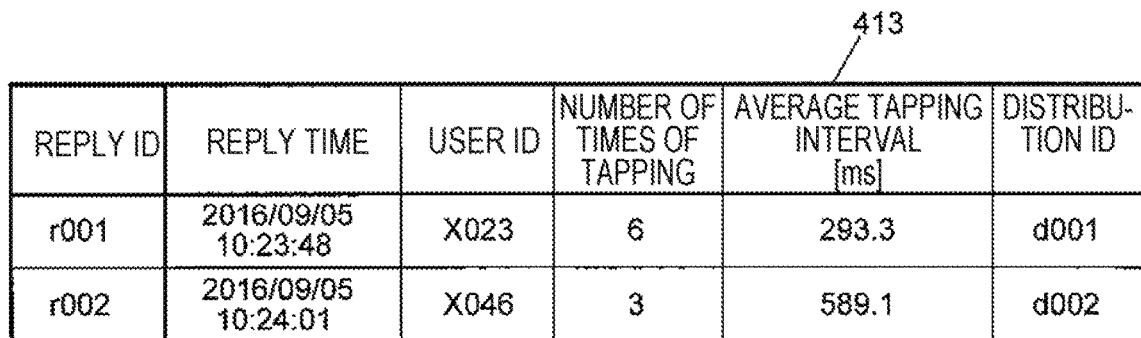
FIG. 8 is a diagram illustrating an example of a reply DB.

FIG. 8 is a diagram illustrating an example of the reply DB 413. The reply DB 413 includes a reply ID column in which the reply ID is recorded, a reply time column in which a reply time is recorded, a user ID column in which the user ID is recorded, a number of times of tapping column in which the number of times of tapping is recorded, an average tapping interval column in which an average tapping interval is recorded, and a distribution ID column in which a distribution ID is recorded.

(Operation of First Exemplary Embodiment)

Next, an example of an operation of the evaluating system 1 according to the first exemplary embodiment will be described with reference to FIGS. 9 to 16 with the operation being divided into (1) Reply Request, (2) Reply, and (3) Evaluation.

(1) Reply Request

Figure 9:
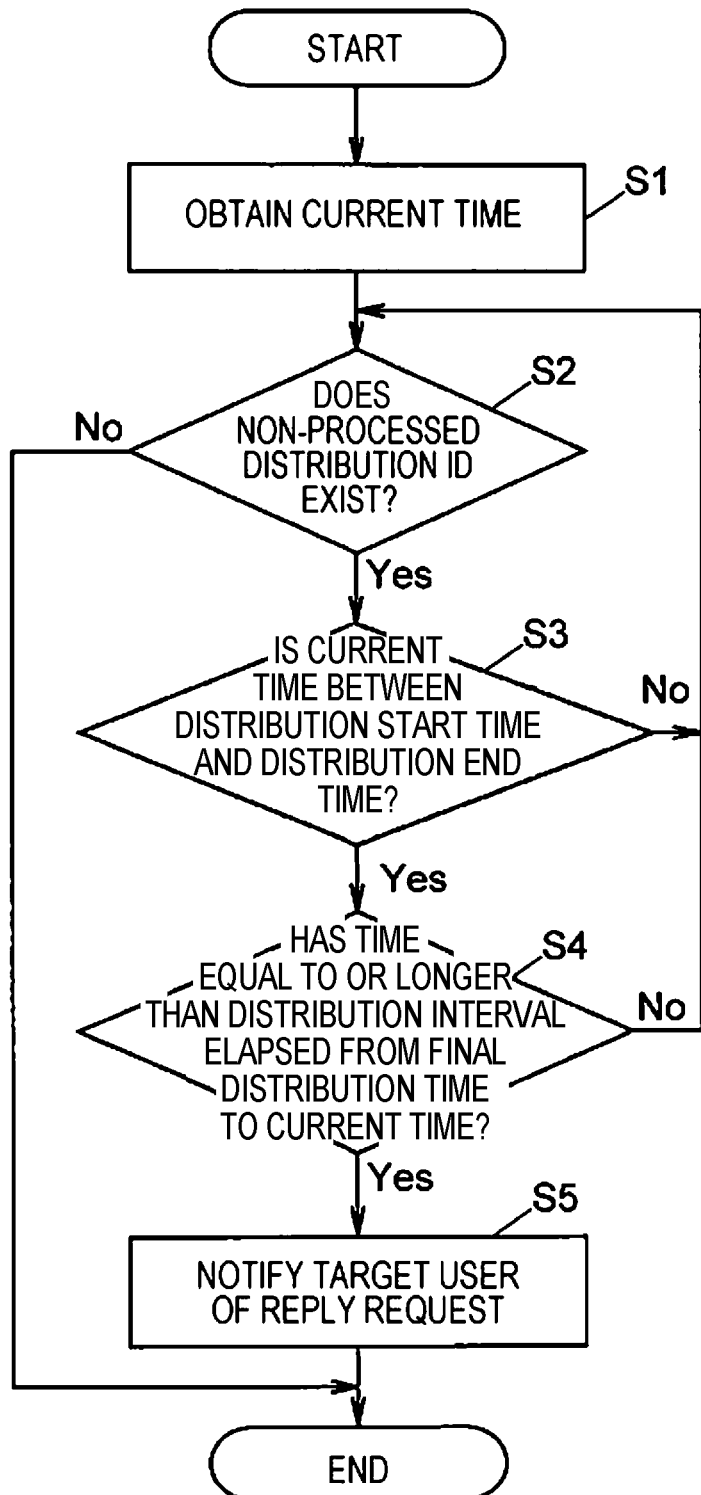
FIG. 9 is a flowchart illustrating an example of an operation of the server device when making a reply request.

FIG. 9 is a flowchart illustrating an example of an operation of the server device 4 when making the reply request. The notifying unit 400 periodically (for example, at an interval of one minute) obtains a current time (S1).

Subsequently, the notifying unit 400 determines whether there exists a distribution ID for which not-ended is recorded in the distribution end flag column of the distribution DB 411 illustrated in FIG. 6, that is, whether a non-processed distribution ID is present in the distribution end flag column of the distribution DB 411 (S2). If the non-processed distribution ID is present (S2: Yes), the notifying unit 400 determines whether the current time is between a distribution start time and a distribution end time (S3). If the current time is between the distribution start time and the distribution end time (S3: Yes), the notifying unit 400 determines whether a time equal to or longer than a distribution interval (5 minutes or 10 minutes in FIG. 6) has elapsed from a final distribution time to the current time (S4).

If it is determined that the time equal to or longer than the distribution interval has elapsed from the current time to the final distribution time (S4: Yes), the notifying unit 400 notifies the target user Pa of the reply request (S5). Specifically, the notifying unit 400 transmits the reply request signal representing the reply request to the plural user terminal devices 2 through the network 3 by the communication unit 42. The reply request signal includes the distribution ID and the user ID.

In the case illustrated in FIG. 6, the notifying unit 400 transmits a reply request signal of a distribution ID (d001) to a user terminal device 2 of a user ID (X023) at an interval of five minutes, transmits a reply request signal of a distribution ID (d002) to a user terminal device 2 of a user ID (X046) at an interval of five minutes, and transmits a reply request signal of a distribution ID (d003) to a user terminal device 2 of a user ID (X201) at an interval of ten minutes.

(2) Reply

Figure 10:
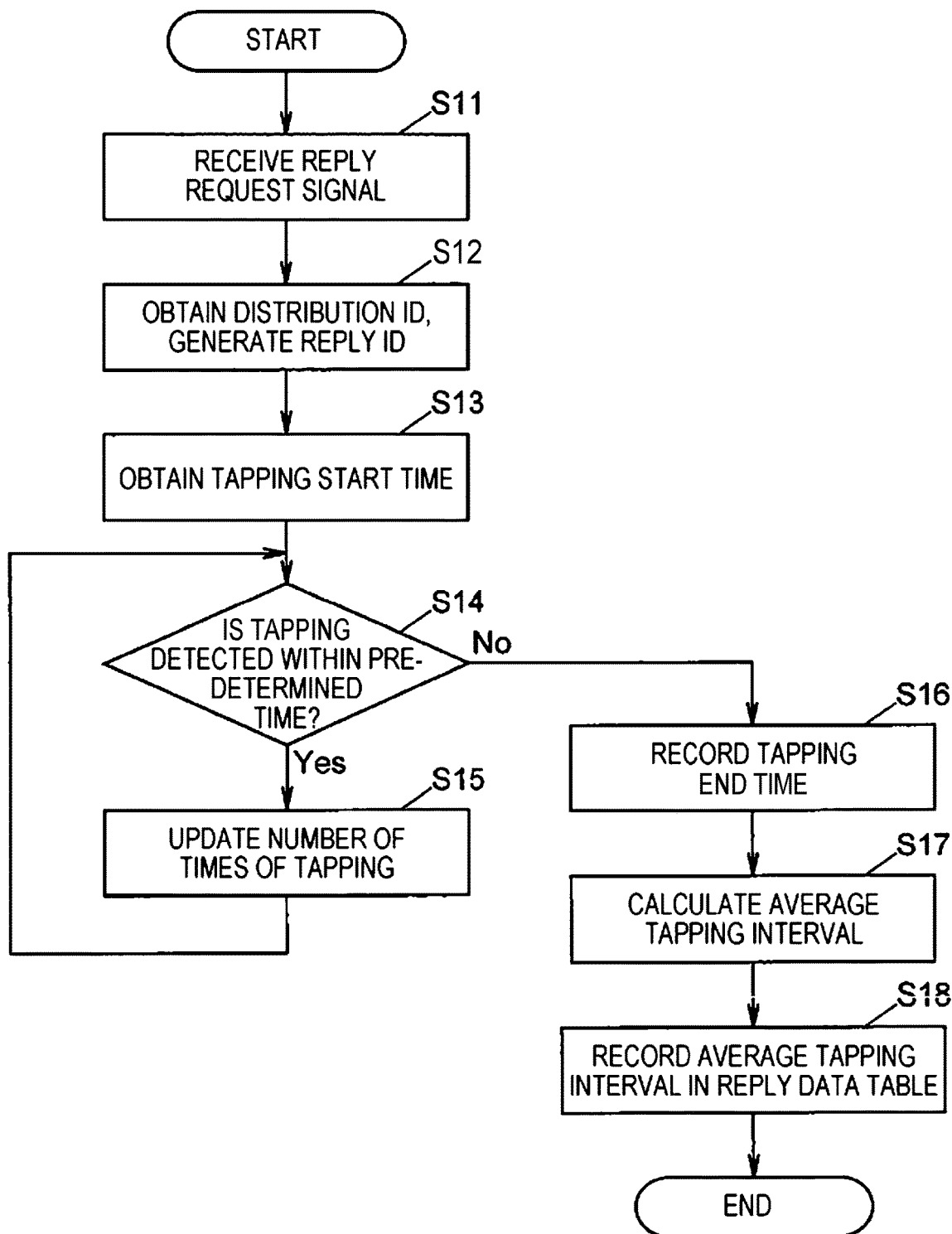
FIG. 10 is a flowchart illustrating an example of an operation of a user terminal device.

FIG. 10 is a flowchart illustrating an example of an operation of the user terminal device 2. When the controller 23 of the user terminal device 2 receives the reply request signal including the user ID and the distribution ID from the server device 4, the receiving unit 230 receives the reply request signal including the user ID that matches with the user ID 241 stored in the memory 24 (S11).

The receiving unit 230 obtains the distribution ID from the received reply request signal, generates a reply ID, and stores the distribution ID and the reply ID in the reply data table 242 (S2). The receiving unit 230 generates the reply ID whenever receiving the reply request signal.

When the receiving unit 230 receives the reply request signal, the imparting unit 231 generates a stimulus through the stimulus generating unit 21 and imparts the stimulus to the target user Pa. The target user Pa continuously performs plural tapping operations on the operation surface 22 of the user terminal device 2.

When detecting a first tapping operation, the detector 232 records a tapping start time in the reply data table 242 and sets 1 in the number of times of tapping column in the reply data table 242 (S13). Then, the detector 232 increments the number of times of tapping whenever detecting the tapping operation.

When detecting the tapping operation within a predetermined time (S14: Yes), the detector 232 updates the number of times of tapping (S15).

When not detecting the tapping operation within the predetermined time (S14: No), the detector 232 records a tapping end time in the tapping end time column of the reply data table 242 (S16).

The calculator 233 calculates an average tapping interval based on the tapping start time, the tapping end time, and the number of times of tapping (S17). That is, the calculator 233 calculates the average tapping interval by dividing a difference between the tapping end time and the tapping start time by the number of times of tapping. The calculator 233 records the average tapping interval in the reply data table 242 (S18).

The reply unit 234 transmits reply data (the reply ID, the reply time, the user ID, the number of times of tapping, the average tapping interval, and the distribution ID) to the server device 4 through the communication unit 25.

When receiving the reply data, the receiving unit 401 of the server device 4 stores the reply data in the reply DB 413.

(3) Evaluation

Figure 11:
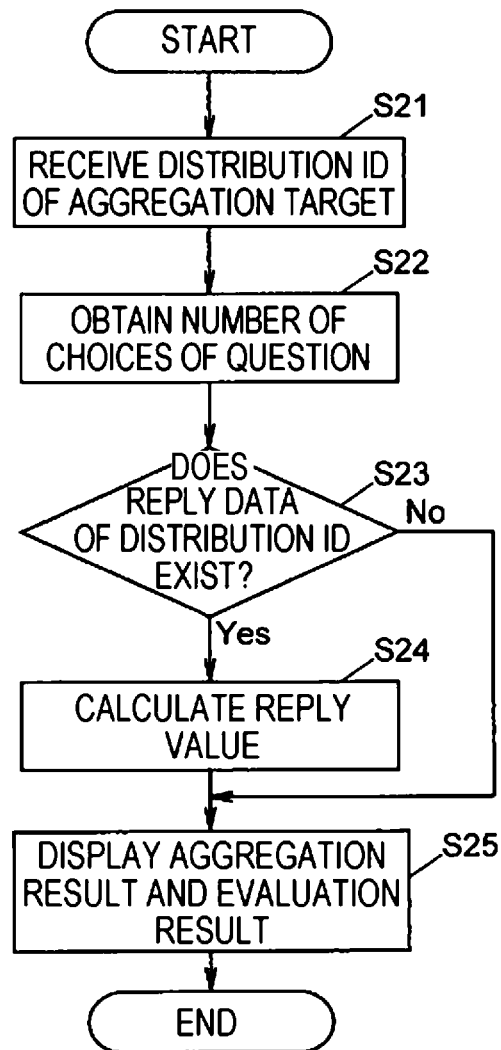
FIG. 11 is a flowchart illustrating an example of an operation of the server device during an evaluation.
Figures 14, 15:
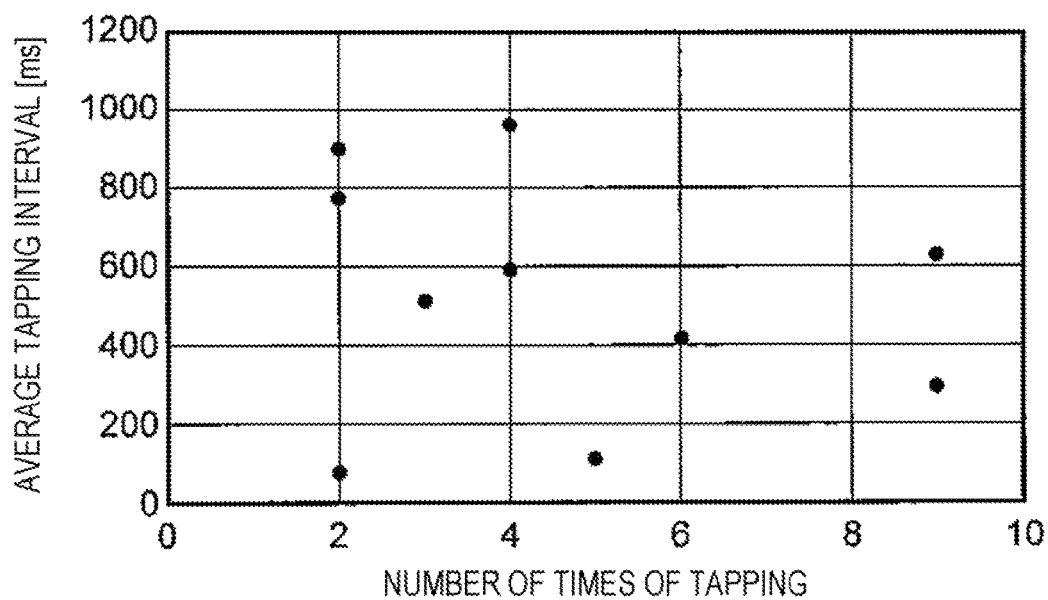
FIG. 14 is a diagram illustrating an example of contents of the reply DB in a case where a distribution and a reply have been completed with regard to the user ID A.
FIG. 15 is a diagram illustrating an example of a relationship between the number of times of tapping and an average tapping interval.

FIG. 11 is a flowchart illustrating an example of an operation of the server device 4 during an evaluation. FIGS. 12, 13, and 14 are diagrams illustrating examples of the contents of the distribution DB, the question DB, and the reply DB, in a case where the distribution and the reply have been completed with regard to the user ID (A), respectively.

The researcher Pb requests the server device 4 to evaluate a distribution ID (for example, d001) of an evaluation target by operating the research terminal device 5. The receiving unit 401 of the server device 4 receives the required distribution ID (d001) (S21).

Next, the evaluating unit 402 obtains, from the distribution DB 411, a question ID (a001) which is recorded in advance in accordance with the distribution ID (d001) and obtains, from the question DB 412, the number of choices (five in the case of FIG. 7) which is recorded in the number of choices column in accordance with the obtained question ID (a001) (S22).

Next, the evaluating unit 402 determines whether the reply data corresponding to the distribution ID exists in the reply DB 413 (S23). If the reply data corresponding to the distribution ID exists in the reply DB 413 (S23: Yes), the evaluating unit 402 calculates an evaluation value $y_i$ (S24).

That is, the evaluating unit 402 calculates the evaluation value $y_i$ for the reply data recorded in the reply DB 413 illustrated in FIG. 14 by using formulas (1), (2), and (3) below.

$$y_i = \frac{(z_{1i} + z_{2i})}{2} \times \frac{N}{2} \qquad (1)$$

where $y_i$ is an evaluation value for i-th reply data, $z_{1i}$ is a standard score of the number of times of tapping of the i-th reply data, $z_{2i}$ is a standard score of the average tapping interval of the i-th reply data, and N is the number of choices.

$$z_{1i} = \frac{(x_{1i} - \overline{x_1})}{S(x_1)} \qquad (2)$$

$$z_{2i} = \frac{(x_{2i} - \overline{x_2})}{S(x_2)} \qquad (3)$$

where $x_{1i}$ is the number of times of tapping, $x_{2i}$ is an average tapping interval, $S(x_1)$ is a standard deviation of the number of times of tapping, $S(x_2)$ is a standard deviation of the average tapping interval, $\overline{x_1}$ is an average value of the number of times of tapping, and $\overline{x_2}$ is an average value of the average tapping intervals.

Next, the evaluating unit 402 calculates the degree of concentration by turning the calculated evaluation value $y_i$ into an integer, for example, by rounding the calculated evaluation value $y_i$ off to the nearest integer.

Figures 16, 17:
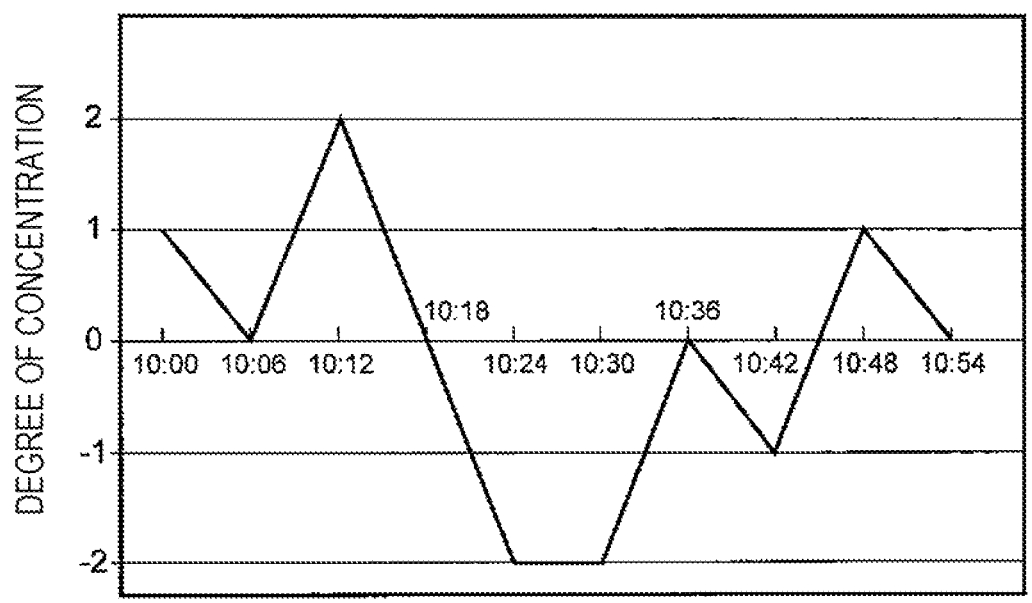
FIG. 16 is a diagram illustrating an example of a degree of concentration calculated by a formula (1) based on the number of times of tapping and the average tapping interval illustrated in FIG. 15.
FIG. 17 is a diagram illustrating modified example 1 of the reply DB.

FIG. 15 is a diagram illustrating an example of a relationship between the number of times of tapping and the average tapping interval. FIG. 16 is a diagram illustrating an example of a degree of concentration calculated by the formula (1) based on the number of times of tapping and the average tapping interval illustrated in FIG. 15.

When people concentrate on something, the number of times of tapping tends to increase or the tapping interval tends to decrease. In the present exemplary embodiment, in order to calculate the degree of concentration with higher accuracy than that calculated merely based on an average of the number of times of tapping and the average tapping interval, the degree of concentration is calculated based on an average of the standard score of the number of times of tapping and the standard score of the average tapping interval.

The evaluating unit 402 of the server device 4 transmits an evaluation result to the research terminal device 5 through the network 3 by the communication unit 42. The research terminal device 5 displays an aggregation result illustrated in FIG. 15 and the evaluation result illustrated in FIG. 16 on the display unit.

Modified Example 1

FIG. 17 is a diagram illustrating modified example 1 of the reply DB. In the present exemplary embodiment, the reply data includes the number of times of tapping and the average tapping interval. In the modified example 1, in order to more accurately calculate an evaluation value compared to the case where the evaluation value is calculated only based on the number of times of tapping, an evaluation value is calculated based on an average tapping interval.

The evaluating unit 402 calculates the evaluation value $y_i$ using a formula (4).

$$y_i = z_{2i} \times \frac{N}{2} \quad (4)$$

where $y_i$ is an evaluation value for i-th reply data, and $z_{2i}$ is a standard score of an average tapping interval of the i-th reply data.

Modified Example 2

FIG. 18 is a diagram illustrating modified example 2 of the reply DB. In the present exemplary embodiment, the reply data includes the number of times of tapping and the average tapping interval. In the modified example 2, in order to more accurately calculate an evaluation value compared to the present exemplary embodiment, the reply data further includes a standard deviation of a tapping interval in addition to the number of times of tapping and the average tapping interval.

The evaluating unit 402 calculates an evaluation value $y_i$ using a formula 5 below.

$$y_i = \frac{(z_{1i} + z_{2i} + z_{3i})}{3} \times \frac{N}{2} \quad (5)$$

where $y_i$ is an evaluation value for i-th reply data, $z_{1i}$ is a standard score of the number of times of tapping of the i-th reply data, $z_{2i}$ is a standard score of an average tapping interval of the i-th reply data, $z_{3i}$ is a standard score of a standard deviation of a tapping interval of the i-th reply data, and N is the number of choices.

Modified Example 3

FIG. 19 is a diagram illustrating modified example 3 of the reply DB. In FIG. 18, the reply data includes the number of times of tapping, the average tapping interval, and the standard deviation of the tapping interval. In the modified example 3, the reply data further includes coefficients corresponding to an activity state of the target user Pa. Examples of the activity state include states such as "in moving" and "in conversation."

In the modified example 3, the coefficients corresponding to the activity state of the target user Pa is multiplied during aggregation. If the target user Pa is being active, for example, "in moving" or "in conversation," the number of times of tapping tends to be unintentionally decreased or the tapping interval tends to be unintentionally increased, so that a standard deviation is increased. Accordingly, in the modified example 3, the reply value $y_i$ is calculated by multiplying a standard score of the number of times of tapping, a standard score of an average tapping interval, and a standard score of a standard deviation of a tapping interval by the coefficients according to the activity in consideration of the activity state of the target user Pa.

The evaluating unit 402 calculates an evaluation value $y_i$ by using a formula (6) below.

$$y_i = \frac{(\alpha \cdot z_{1i} + \beta \cdot z_{2i} + \gamma \cdot z_{3i})}{3} \times \frac{N}{2} \quad (6)$$

where $\alpha$, $\beta$, and $\gamma$ are coefficients that vary according to the activity state of the target user Pa, $y_i$ is the evaluation value for i-th reply data, $z_{1i}$ is a standard score of the number of times of tapping of the i-th reply data, $z_{2i}$ is a standard score of an average tapping interval of the i-th reply data, $z_{3i}$ is a standard score of a standard deviation of a tapping interval of the i-th reply data, and N is the number of choices.

Modified Example 4

Figure 20:
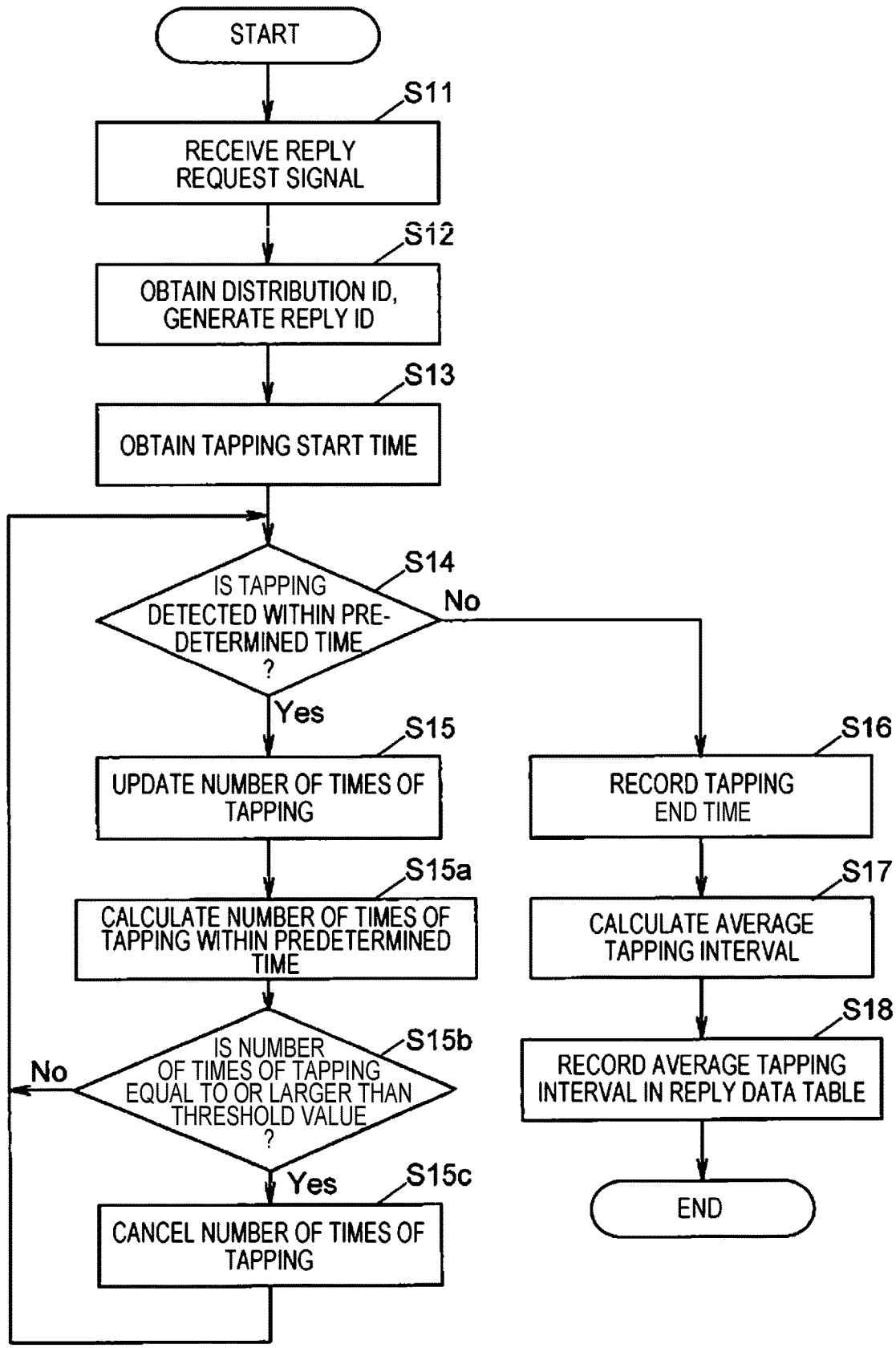
FIG. 20 is a flowchart illustrating an example of an operation of a user terminal device according to modified example 4.

FIG. 20 is a flowchart illustrating an example of an operation of the user terminal device 2 according to modified example 4. The following description will focus on differences from those of the flowchart of FIG. 10. In FIG. 20, a step of calculating the number of times of tapping within a predetermined time (S15a), a step of determining whether the number of times of tapping which is calculated in step S15a is equal to or larger than a threshold value (S15b), and a step of canceling the number of times of tapping (S15c) are added after the step of updating the number of times of tapping (S15) illustrated in FIG. 10.

By continuously performing the erroneously performed tapping operation within the predetermined time (S15a, S15b), the target user Pa may cancel the number of times of tapping which is based on the previously performed tapping operations (S15c).

Modified Example 5

Figure 21:
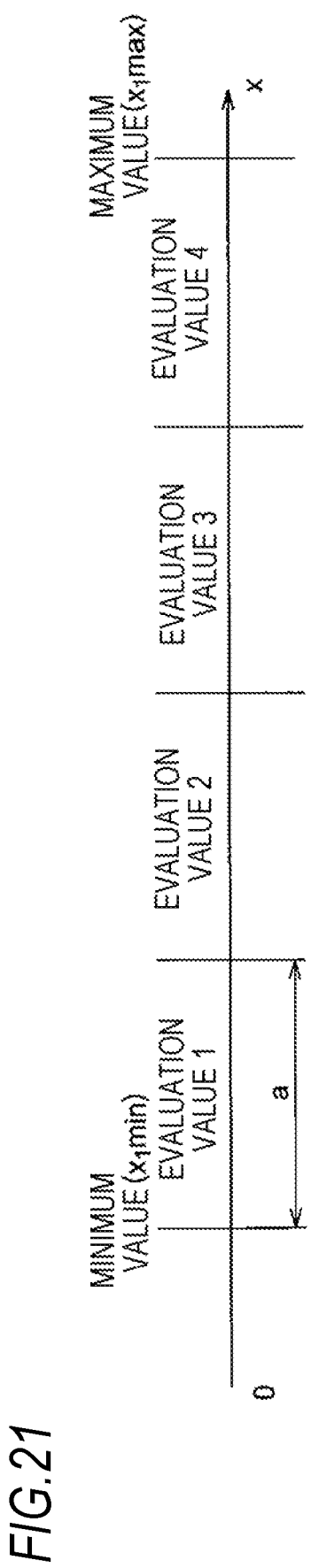
FIG. 21 is a diagram for describing a method of calculating an evaluation value according to modified example 5.

FIG. 21 is a diagram for describing a method of calculating an evaluation value according to modified example 5. In the modified example 5, an evaluation value is calculated using a minimum value and a maximum value of measured values.

Assuming that the number of times of tapping by a general target user varies from a minimum value x1min to a maximum value x1max, a zone between the minimum value x1min and the maximum value x1max is divided into sub-zones by the number of choices N (four in FIG. 21) and four evaluation values from an evaluation value 1 to an evaluation value 4 are assigned to the respective sub-zones as illustrated in FIG. 21. The width "a" of an evaluation value is represented by a=(x1min−x1max)/N. Similarly, for an average tapping interval, a zone between a minimum value x2 min to a maximum value x2max is divided into sub-zones by the number of choices N (for example, four), and four evaluation values from evaluation value 1 to evaluation value 4 are assigned to the respective sub-zones. The width "a" of an evaluation value is represented by a=(x2 min−x2max)/N. It is possible to calculate an evaluation value $y_i$ using formulas (7), (8), and (9) below.

$$y_i = \frac{(z_{1i} + z_{2i})}{2} \times \frac{N}{2} \quad (7)$$

where $y_i$ is an evaluation value for i-th reply data, $z_{1i}$ is an evaluation value of the number of times of tapping of the i-th reply data, $z_{2i}$ is an evaluation value of an average tapping interval of the i-th reply data, and N is the number of choices.

$$z_{1i} = \begin{cases} 1 & (x_{1min} \leq x_1 < x_{1min} + a) \\ \vdots & \\ N & (x_{1min} + (N-1)a \leq x_1 < x_{1min} + Na) \end{cases} \quad (8)$$

$$z_{2i} = \begin{cases} 1 & (x_{2min} \leq x < x_{2min} + a) \\ \vdots & \\ N & (x_{2min} + (N-1)a \leq x < x_{2min} + Na) \end{cases} \quad (9)$$

Second Exemplary Embodiment

Figure 22:
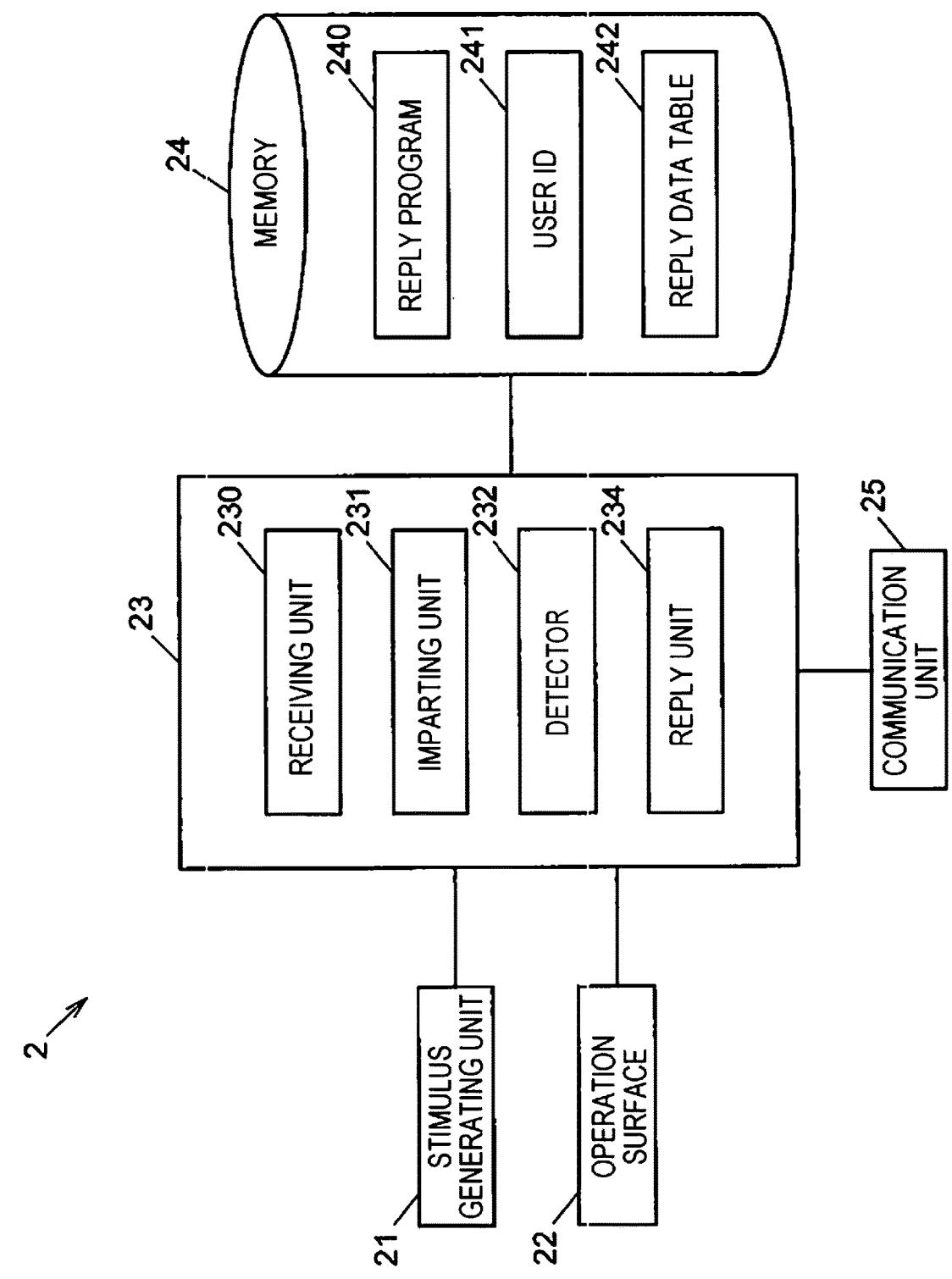
FIG. 22 is a block diagram illustrating an example of a control system of a user terminal device according to a second exemplary embodiment of the present invention.
Figure 23:
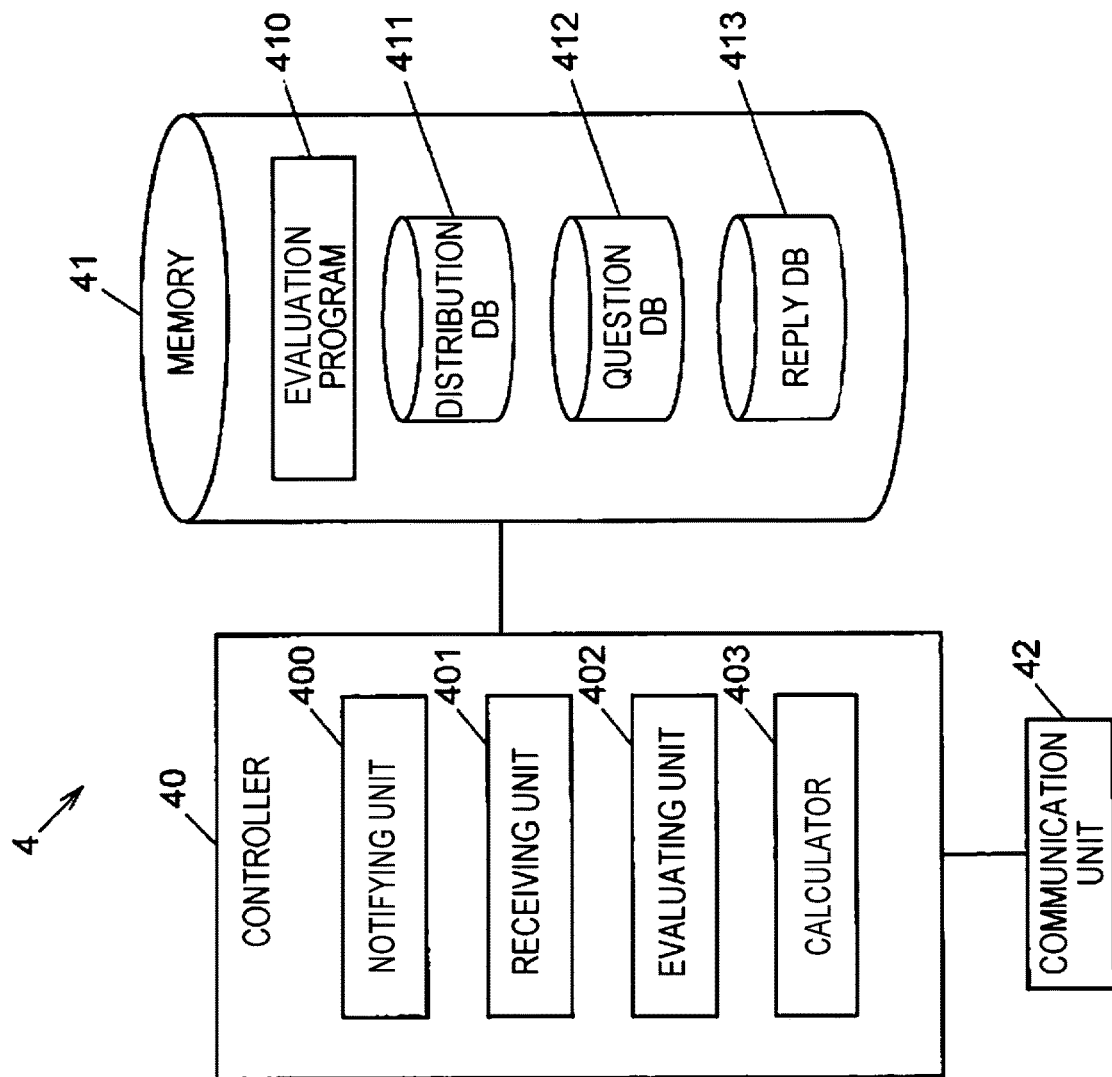
FIG. 23 is a block diagram illustrating an example of a control system of a server device according to a second exemplary embodiment of the present invention.

FIG. 22 is a block diagram illustrating an example of a control system of a user terminal device 2 according to a second exemplary embodiment of the present invention. FIG. 23 is a block diagram illustrating an example of a control system of a server device 4 according to the second exemplary embodiment of the present invention.

In the first exemplary embodiment, the user terminal device 2 counts the number of times of tapping and calculates the average tapping interval. On the other hand, in the second exemplary embodiment, in order to reduce the processing burden of the user terminal device 2, the server device 4 counts the number of times of tapping and calculates the average tapping interval. The following description will focus on differences from those of the first exemplary embodiment.

As illustrated in FIG. 22, the user terminal device 2 includes a stimulus generating unit 21, an operation surface 22, a controller 23, a memory 24, and a communication unit 25 as in the first exemplary embodiment. The controller 23 operates according to a reply program 240 to serves as a receiving unit 230, an imparting unit 231, a detector 232, a reply unit 234, and the like. It should be noted that the controller 23 does not serve as a calculator.

As illustrated in FIG. 23, the server device 4 includes a controller 40, a memory 41, and a communication unit 42 as in the first exemplary embodiment. The controller 40 operates according to an evaluation program 410 to serve as a notifying unit 400, a receiving unit 401, and an evaluating unit 402 and to further serve as a calculator 403.

A reply data table 242 stored in the memory 24 of the user terminal device 2 includes a distribution ID column, a reply ID column, a tapping start time column, and a tapping end time column as in the first exemplary and further includes a tapping time column in which a tapping time is recorded. It should be noted that the reply data table 242 does not include a number of times of tapping column and an average tapping interval column.

The detector 232 of the user terminal device 2 records a tapping time in the tapping time column of the reply data table 242 whenever detecting tapping.

The reply unit 234 transmits reply data including a reply ID, a reply time, a user ID, the tapping time, and a distribution ID to the server device 4.

The calculator 403 of the server device 4 counts the number of times of tapping based on the tapping time included in the reply data transmitted from the user terminal device 2, and calculates an average tapping interval.

The evaluating unit 402 calculates the degree of concentration by calculating an evaluation value based on the number of times of tapping and the average tapping interval calculated by the calculator 403, as in the first exemplary embodiment.

In the foregoing, the exemplary embodiments of the present invention have been described, but the exemplary embodiments of the present invention are not limited to the above-described exemplary embodiments, and may be variously modified and carried without changing the main principle of the present invention. For example, the tapping operation has been described in the above-described exemplary embodiments. However, the same actions and effects as those of the tapping operation are exerted even with operations other than tapping, such as a rubbing operation and a shaking operation.

A part or the entirety of each unit of the controllers 23 and 40 may be formed by a hardware circuit, such as a field programmable gate array (FPGA) or an application specific integrated circuit (ASIC).

Without changing the gist of the present invention, some of the constituent elements of the exemplary embodiment may be omitted or changed. Further, without changing the gist of the present invention, in the flow of the exemplary embodiment, a step may be added, deleted, changed, replaced, and so on. Further, a program used in the exemplary embodiment may be provided in the state of being recorded in a computer readable recording medium, such as a CD-ROM, and may also be stored in an external server, such as a cloud server, and used through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An evaluating apparatus comprising:
a notifying unit that notifies a terminal device of a reply request by transmitting the reply request to the terminal device over communication network, wherein
the reply request includes user identification information associated with a target person and distribution identification information, and
the reply request is transmitted after determining that current time is between a start time and an end time associated with the distribution identification information; and
an evaluating unit that calculates subjective data which expresses a subjective intuition of the target person by an evaluation value, from objective data which is calculated based on
a plurality of touch operations performed by the target person on the terminal device which has received the reply request, and
intervals between the touch operations.

2. The evaluating apparatus according to claim 1, wherein the evaluating unit uses a number of the touch operations and an average interval between the touch operations, as the objective data.

3. The evaluating apparatus according to claim 2, wherein the evaluating unit calculates the subjective data using a standard score of the number of the touch operations and a standard score of the average interval between the touch operations.

4. The evaluating apparatus according to claim 2, wherein the evaluating unit calculates the subjective data using a standard score of the number of the touch operations, a standard score of the average interval between the touch operations, and a standard score of a standard deviation of an interval between the touch operations.

5. The evaluating apparatus according to claim 4, wherein each of the standard scores is multiplied by a coefficient corresponding to an activity of the target person.

6. The evaluating apparatus according to claim 2, further comprising:
a receiving unit that receives information about the touch operations from the terminal device; and
a calculator that calculates the objective data based on the received information about the touch operations in consideration of the intervals between the touch operations.

7. The evaluating apparatus according to claim 1, wherein the evaluating unit uses an average interval between the touch operations as the objective data.

8. The evaluating apparatus according to claim 7, wherein the evaluating unit calculates the subjective data using a standard score of the average interval between the touch operations.

9. The evaluating apparatus according to claim 7, further comprising:
a receiving unit that receives information about the touch operations from the terminal device; and
a calculator that calculates the objective data based on the received information about the touch operations in consideration of the intervals between the touch operations.

10. The evaluating apparatus according to claim 1, wherein the subjective data is represented on a scale of predetermined N levels according to contents of the subjective data.

11. The evaluating apparatus according to claim 10, further comprising:
a receiving unit that receives information about the touch operations from the terminal device; and
a calculator that calculates the objective data based on the received information about the touch operations in consideration of the intervals between the touch operations.

12. The evaluating apparatus according to claim 1, further comprising:
a receiving unit that receives the objective data from the terminal device.

13. The evaluating apparatus according to claim 1, further comprising:
a receiving unit that receives information about the touch operations from the terminal device; and
a calculator that calculates the objective data based on the received information about the touch operations in consideration of the intervals between the touch operations.

14. A terminal device comprising:
an imparting unit that imparts a stimulus to a target person operating the terminal device when a reply request is received from a remote apparatus over communication network, wherein
the reply request includes user identification information associated with the target person and distribution identification information, and
a transmission time at which the reply request is sent is between a start time and an end time associated with the distribution identification information;
a detector that detects a plurality of touch operations performed by the target person after the stimulus is imparted; and
a calculator that calculates objective data based on the plurality of detected touch operations and intervals between the touch operations.

15. An evaluating apparatus comprising:
notifying means for notifying a terminal device of a reply request by transmitting the reply request to the terminal device over communication network, wherein
the reply request includes user identification information associated with a target person and distribution identification information, and
the reply request is transmitted after determining that current time is between a start time and an end time associated with the distribution identification information; and
evaluating means for calculating subjective data which expresses a subjective intuition of the target person by an evaluation value, from objective data which is calculated based on
a plurality of touch operations performed by the target person on the terminal device which has received the reply request, and
intervals between the touch operations.

* * * * *